(12) United States Patent
Cheong et al.

(10) Patent No.: US 11,726,643 B2
(45) Date of Patent: Aug. 15, 2023

(54) TECHNIQUES FOR VISUALIZING PROBABILISTIC DATA GENERATED WHEN DESIGNING MECHANICAL ASSEMBLIES

(71) Applicant: AUTODESK, INC., San Francisco, CA (US)

(72) Inventors: Hyunmin Cheong, Toronto (CA); Mehran Ebrahimi, Toronto (CA); Adrian Butscher, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/058,210

(22) Filed: Nov. 22, 2022

(65) Prior Publication Data

US 2023/0082505 A1 Mar. 16, 2023

Related U.S. Application Data

(63) Continuation of application No. 17/377,036, filed on Jul. 15, 2021, now Pat. No. 11,513,665, which is a continuation of application No. 16/434,082, filed on Jun. 6, 2019, now Pat. No. 11,068,135.

(60) Provisional application No. 62/841,767, filed on May 1, 2019, provisional application No. 62/837,157, filed on Apr. 22, 2019.

(51) Int. Cl.
*G06F 3/048* (2013.01)
*G06F 3/0484* (2022.01)
*G06F 30/00* (2020.01)

(52) U.S. Cl.
CPC ............ *G06F 3/0484* (2013.01); *G06F 30/00* (2020.01)

(58) Field of Classification Search
CPC .............................. G06F 3/0484; G06F 30/00
See application file for complete search history.

(56) References Cited

U.S. PATENT DOCUMENTS

| 6,963,824 B1 | 11/2005 | Davidson et al. |
| 9,953,108 B2 | 4/2018 | Santiquet et al. |

(Continued)

OTHER PUBLICATIONS

Sourceforce.net, "FreeCad Version 0.15 manual", Mar. 21, 2015, 408 pages.

(Continued)

*Primary Examiner* — David Phantana-angkool
(74) *Attorney, Agent, or Firm* — Artegis Law Group, LLP

(57) ABSTRACT

A design engine implements a probabilistic approach to generating designs that exposes automatically-generated design knowledge to the user during operation. The design engine interactively generates successive populations of designs based on a problem definition associated with a design problem and/or a previously-generated population of designs. During the above design process, the design engine generates a design knowledge graphical user interface (GUI) that graphically exposes various types of design knowledge to the user. In particular, the design engine generates a design variable dependency GUI that visualizes various dependencies between designs variables. The design engine also generates a design evolution GUI that animates the evolution of designs across the successive design populations. Additionally, the design engine generates a design exploration GUI that facilitates the user exploring various statistical properties of automatically-generated designs.

21 Claims, 10 Drawing Sheets

(56) References Cited

U.S. PATENT DOCUMENTS

| | | | |
|---|---|---|---|
| 10,013,510 | B1 | 7/2018 | Kanthasamy et al. |
| 10,254,941 | B2 | 4/2019 | Bowen |
| 10,346,005 | B2 | 7/2019 | Delfino et al. |
| 10,430,524 | B1 | 10/2019 | Stiles et al. |
| 10,474,927 | B2 | 11/2019 | Yang |
| 10,628,532 | B2 | 4/2020 | Cheong et al. |
| 10,796,266 | B2 | 10/2020 | Lamkin et al. |
| 10,839,110 | B2* | 11/2020 | Iorio ............... G06F 16/24578 |
| 10,885,236 | B2 | 1/2021 | Cheong et al. |
| 10,915,672 | B2 | 2/2021 | Cheong et al. |
| 11,244,083 | B2* | 2/2022 | Cheong .................. G06N 5/04 |
| 11,275,870 | B2* | 3/2022 | Diguet .................. G06F 30/00 |
| 11,288,417 | B2 | 3/2022 | Yu et al. |
| 2008/0172208 | A1 | 7/2008 | Lechine |
| 2010/0010655 | A1 | 1/2010 | Corcoran et al. |
| 2011/0093465 | A1 | 4/2011 | Sporer et al. |
| 2011/0251711 | A1 | 10/2011 | Goel |
| 2013/0013993 | A1 | 1/2013 | Oh |
| 2015/0324494 | A1 | 11/2015 | Iorio et al. |
| 2016/0147911 | A1 | 5/2016 | Bergin et al. |
| 2016/0171144 | A1 | 6/2016 | Suiter |
| 2017/0024493 | A1 | 1/2017 | Cheong et al. |
| 2017/0024511 | A1 | 1/2017 | Cheong et al. |
| 2017/0024647 | A1 | 1/2017 | Cheong et al. |
| 2017/0072641 | A1 | 3/2017 | Grivetti |
| 2017/0076013 | A1 | 3/2017 | Grivetti |
| 2018/0060469 | A1 | 3/2018 | Morgan et al. |
| 2018/0089575 | A1* | 3/2018 | Cheong .................. G06F 30/15 |
| 2018/0299868 | A1 | 10/2018 | Grafen et al. |
| 2019/0065661 | A1 | 2/2019 | Cheong et al. |
| 2019/0197198 | A1 | 6/2019 | Cheong et al. |
| 2019/0213300 | A1 | 7/2019 | Cheong et al. |
| 2019/0286786 | A1 | 9/2019 | Ebrahimi et al. |
| 2020/0333928 | A1* | 10/2020 | Cheong ................. G06F 3/0484 |
| 2020/0334337 | A1 | 10/2020 | Cheong et al. |
| 2021/0342046 | A1* | 11/2021 | Cheong .................. G06F 30/17 |

OTHER PUBLICATIONS

Suh, N. P., "The Principles of Design", Oxford University Press, 1990, pp. 243-246.

Mittal et al., "Towards a Generic Model of Configuraton Tasks", IJCAI, vol. 89, 1989, pp. 1395-1401.

Baluja, Shumeet, "Population-Based Incremental Learning: A Method for Integrating Genetic Search based Function Optimization and Competitive Learning", Technical Report, No. CMU-CS-94-163. Carnegie-Mellon University of Pittsburgh, Dept of Computer Science, Jun. 2, 1994, 41 pages.

Bonet et al., "MIMIC: Finding Optima by Estimating Probability Densities", Advances in Neural Information Processing Systems, 1997, pp. 424-430.

Harik et al., "The compact genetic algorithm", IEEE Transactions on Evolutionary Computation, vol. 3, No. 4, Nov. 1999, pp. 287-297.

Harik et al., "Linkage Learning via Probabilistic Modeling in the Extended Compact Genetic Algorithm (ECGA)," Scalable Optimization via Probabilistic Modeling, Studies in Computational Intelligence, vol. 33. Berlin, Heidelberg, Springer, 2006, pp. 39-61.

Pelikan et al., "The Bivariate Marginal Distribution Algorithm", Advances in Soil Computing. London: Springer, 1999, pp. 521-535.

Pelikan et al., "BOA: The Bayesian Optimization Algorithmn", Proceedings of the Genetic and Evolutionary Computation Conference, 1999, 8 pages.

Santana, Roberto, "Estimation of Distribution Algorithms with Kikuchi Approximations", Evolutionary Computation, vol. 13, No. 1, 2005, pp. 67-97.

Lima et al., "Substructural Neighborhoods for Local Search in the Bayesian Optimization Algorithm", Parallel Problem Solving from Nature-PPSN IX Berlin, Heidelberg: Springer, 2006, pp. 232-241.

Shakya et al., "Optimization by Estimation of Distribution with DEUM Framework Based on Markov Random Fields", International Journal of Automation and Computing, vol. 4, No. 3, 2007, pp. 262-272.

Shakya et al., "A Markovianity based Optimisation Algorithm", Genetic Programming and Evolvable Machines, vol. 13, No. 2, 2012, pp. 159-195.

Alden et al., "MARLEDA: Effective Distribution Estimation through Markov Random Fields", Theoretical Computer Science, vol. 633, 2016, pp. 4-18.

Martins et al., "On the Performance of Multi-Objective Estimation of Distribution Algorithms for Combinatorial Problems", IEEE Congress on Evolutionary Computation (CEC), 2018, 8 pages.

Coello, Carlos A. "Theoretical and Numerical Constraint-Handling Techniques used with Evolutionary Algorithms: A Survey of the State of the Art", Computer Methods in Applied Mechanics and Engineering, vol. 191, No. 11-12, 2002, pp. 1245-1287.

Angelov et al., "Automatic Design Synthesis and Optimization of Component-based Systems by Evolutionary Algorithms," Proceedings of the Genetic and Evolutionary Computation Conference, 2003, pp. 1938-1950.

Grignon et al., "A GA based Configuration Design Optimization Method," Journal of Mechanical Design, vol. 126, No. 1, Jan. 2004, pp. 6-15.

Chapman et al., "Genetic Algorithms as an Approach to Configuration and Topology Design," Journal of Mechanical Design, vol. 116, No. 4, 1994, pp. 1005-1012.

Tanie et al., "Topology and Shape Optimization of Continuum Structures using GA and BEM," Structural Optimization, vol. 17, No. 2-3, 1999, pp. 130-139.

Auling et al., "State-Based Representation for Structural Topology Optimization and Application to Crashworthiness," IEEE Congress on Evolutionary Computation (CEC), 2016, pp. 1642-1649.

Guirguis et al., "An Evolutionary Multi-Objective Topology Optimization Framework for Welded Structures," IEEE Congress on Evolutionary Computation (CEC), 2016, pp. 372-378.

Islam et al., "Multimodal Truss Structure Design using Bilevel and Niching based Evolutionary Algorithms," Proceedings of the Genetic and Evolutionary Computation Conference, Jul. 15-19, 2017, pp. 274-281.

Wu et al., "Integrated Discrete and Configuration Optimization of Trusses Using Genetic Algorithms," Computers & Structures, vol. 55, No. 4, 1995, pp. 695-702.

D'Souza et al., "A Genetic Algorithm based Method for Product Family Design Optimization," Engineering Optimization, vol. 35, No. 1, 2010, pp. 1-18.

Choubey et al., "Solving a Fixture Configuration Design Problem using Genetic Algorithm with Learning Automata Approach," International Journal of Production Research, vol. 43, No. 22, 2005, pp. 4721-4743.

Shirahatt et al., "Optimal Design of Passenger Car Suspension for Ride and Road Holding," Journal of the Brazilian Society of Mechanical Sciences and Engineering, vol. 30, No. 1, Jan.-Mar. 2008, pp. 66-76.

Arikere et al., "Optimisation of Double Wishbone Suspension System Using Multi-Objective Genetic Algorithm", Lecture Notes in Computer Science, vol. 6457, 2010, pp. 445-454.

Simionescu et al., "Teeth-Number Synthesis of a Multispeed Planetary Transmission Using an Estimation pf Distribution Algorithm", Journal of Mechanical Design, vol. 128, No. 1, Jan. 2006, pp. 108-115.

Sun et al., "A Hybrid Estimation of Distribution Algorithm for Cdma Cellular System Design," International Journal of Computational Intelligence and Applications, vol. 7, No. 2, 2008, pp. 187-200.

Zhong et al., "A Robust Estimation of Distribution Algorithm for Power Electronic Circuits Design," Proceedings of the genetic and Evolutionary Computation Conference, Jul. 7-11, 2010, pp. 319-326.

Deb et al., "Towards Optimal Ship Design and Valuable Knowledge Discovery Under Uncertain Conditions", IEEE Congress on Evolutionary Computation (CEC), 2015, 8 pages.

Greenwood et al., "Guide to Tables in Mathematical Statistics", Princeton, New Jersey: Princeton University Press, 1962, 130 pages.

(56) References Cited

OTHER PUBLICATIONS

Brown et al., "Exploring the Use of Constraint Programming for Enforcing Connectivity during Graph Generation", In the 5th Workshop on Modelling and Solving Problems with Constraints (held at IJCAI05), 2005, 6 pages.
Ebrahimi et al., "Design Optimization of Dynamic Flexible Multibody Systems Using the Discrete Adjoint Variable Method," Computers and Structures, 2018, 18 pages.
Zhang et at, "Comparison of Selection Methods for Evolutionary Optimization," Evolutionary Optimization, vol. 2, No. 1, 2000, pp. 55-70.
Gaur et al., "Finding Near-Optimum and Diverse Solutions for a Large-Scale Engineering Design Problem," IEEE Symposium Series on Computational Intelligence, 2017, 8 pages.
Mariani et al., "DeSpErate++: An Enhanced Design Space Exploration Framework Using Predictive Simulation Scheduling", IEEE Transactions on Computer-Aided Design of Integrated Circuits and Systems, DOI:10.1109/TCAD.2014.2379634, vol. 34, No. 2, Feb. 1, 2015, pp. 293-306.
Slanzi et al., "Evolutionary Bayesian Network design for High Dimensional Experiments", Chemometrics and Intelligent Laboratory Systems, Elsevier Science Publishers, DOI:10.1016/J.CHEMOLAB.2014.04.013, vol. 135, Apr. 30, 2014, pp. 172-182.

\* cited by examiner

TECHNIQUES FOR VISUALIZING PROBABILISTIC DATA GENERATED WHEN DESIGNING MECHANICAL ASSEMBLIES

CROSS-REFERENCE TO RELATED APPLICATIONS

This application is a continuation of the co-pending U.S. patent application titled, "TECHNIQUES FOR VISUALIZING PROBABILISTIC DATA GENERATED WHEN DESIGNING MECHANICAL ASSEMBLIES," filed on Jul. 15, 2021 and having Ser. No. 17/377,036, which is a continuation of U.S. patent application titled, "TECHNIQUES FOR VISUALIZING PROBABILISTIC DATA GENERATED WHEN DESIGNING MECHANICAL ASSEMBLIES," filed on Jun. 6, 2019 and having Ser. No. 16/434,082, issued as U.S. Pat. No. 11,068,135, which claims priority benefit of the United States Provisional application titled "VISUALIZING AND DISPLAYING PROBABALISTIC KNOWLEDGE OBTAINED DURING GENERATIVE DESIGN OF MECHANICAL ASSEMBLIES", filed Apr. 22, 2019 and having Ser. No. 62/837,157, and also claims the priority benefit of United States provisional patent application titled, "VISUALIZING AND DISPLAYING PROBABALISTIC KNOWLEDGE OBTAINED DURING GENERATIVE DESIGN OF MECHANICAL ASSEMBLIES", filed May 1, 2019 and having Ser. No. 62/841,767. The subject matter of these related application is hereby incorporated herein by reference.

BACKGROUND

Field of the Various Embodiments

The various embodiments relate generally to computer-aided design technology and, more specifically, to techniques for visualizing probabilistic data generated when designing mechanical assemblies.

Description of the Related Art

In a typical mechanical engineering and design workflow, a designer uses a computer-aided design (CAD) application to generate CAD models that represent mechanical components. The designer also can use the CAD application to combine two or more CAD models to generate a CAD assembly. The CAD models included in the CAD assembly are typically coupled together in a manner that achieves a particular function to address a specific design problem. For example, a CAD assembly that represents an automobile transmission could include a collection of CAD models representing gears that are coupled together to provide torque conversions. The design problem addressed in this example would be the need to transmit torque from the automobile crankshaft to the wheels of the automobile.

Generating a CAD assembly using a CAD application is typically a manually-performed, multi-step process. Initially, a designer formulates the design problem to be addressed by the CAD assembly by determining a set of design objectives the CAD assembly should meet. For example, when formulating the automobile transmission design problem discussed above, the designer could determine that the transmission should implement a specific conversion ratio in order to convert an input torque received from the automobile crankshaft to an output torque that is applied to the wheels of the automobile. In conjunction with determining the set of design objectives, the designer usually further defines the design problem by determining a set of design constraints that the CAD assembly should not violate. In the transmission design problem discussed above, for example, the designer could determine that the mass of the transmission should not exceed a particular value. Once the designer determines the various design objectives and design constraints, the designer can then use the CAD application to generate the CAD assembly by manually generating and combining various CAD models. For example, the transmission designer could determine a specific arrangement of CAD models representing a selected set of gears to generate a CAD assembly that implements the desired conversion between input and output torques.

As previously mentioned, through the above design process, the designer generates a CAD assembly that is meant to address a particular design problem. Once generated, the designer can further test the CAD assembly, via computer simulation, to determine whether the various design objectives are met without violating the different constraints. The design process is usually repeated iteratively, in a trial-and-error fashion, in an attempt to explore the overall design space associated with the particular design problem and produce one or more successful designs.

Conventional design processes, like the design process set forth above, can be automated to a certain extent using various algorithmic techniques. For example, generative design techniques can be implemented to automatically generate CAD assemblies that meet a set of stated design objectives without violating a set of enumerated design constraints. Alternatively, constraint-based programming techniques can be implemented to identify feasible CAD assemblies that address stated design objectives to varying degrees. Such algorithmic techniques reduce the number of manual operations that have to be performed by the designer, where the algorithms automatically perform those operations instead, thereby streamlining the overall design process. When the design process is complete, the designer is presented with a handful of automatically-generated designs that can be inspected using a conventional CAD application graphical user interface (GUI).

One drawback of the above approach is that inspecting the automatically-generated designs resulting from the above approach using a conventional CAD application GUI does not provide designers with appropriate levels of intuitive design knowledge and understanding. Consequently, algorithmic design techniques in general, and conventional CAD application GUIs in particular, do not empower designers to make informed decisions about how to modify, or generate alternatives to, algorithmically-generated designs. Further, without being able to develop an intuitive understanding of how successful designs are constructed and structured, designers cannot communicate design knowledge to other designers. Consequently, designers can have difficulty collaborating with one another on design projects.

As the foregoing illustrates, what is needed in the art are more effective ways to automatically generate designs of mechanical assemblies.

SUMMARY

Various embodiments include a computer-implemented method for generating designs, including generating a first plurality of designs based on a problem definition associated with a design problem and a first set of design variables associated with the design problem, analyzing the first plurality of designs statistically to determine a first statistical attribute associated with a first design variable included in the first set of design variables, and generating a graphical user interface (GUI) based on the first statistical attribute and the first plurality of designs to graphically depict the first statistical attribute.

At least one technological advantage of the disclosed techniques relative to the prior art is that design knowledge is exposed to the user via the GUI during automatic generation of designs. This exposure facilities the user in developing an intuitive understanding of how successful designs are constructed and structured. As a result, the user is empowered to make informed decisions regarding how to modify designs and/or how to explore alternative design options.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
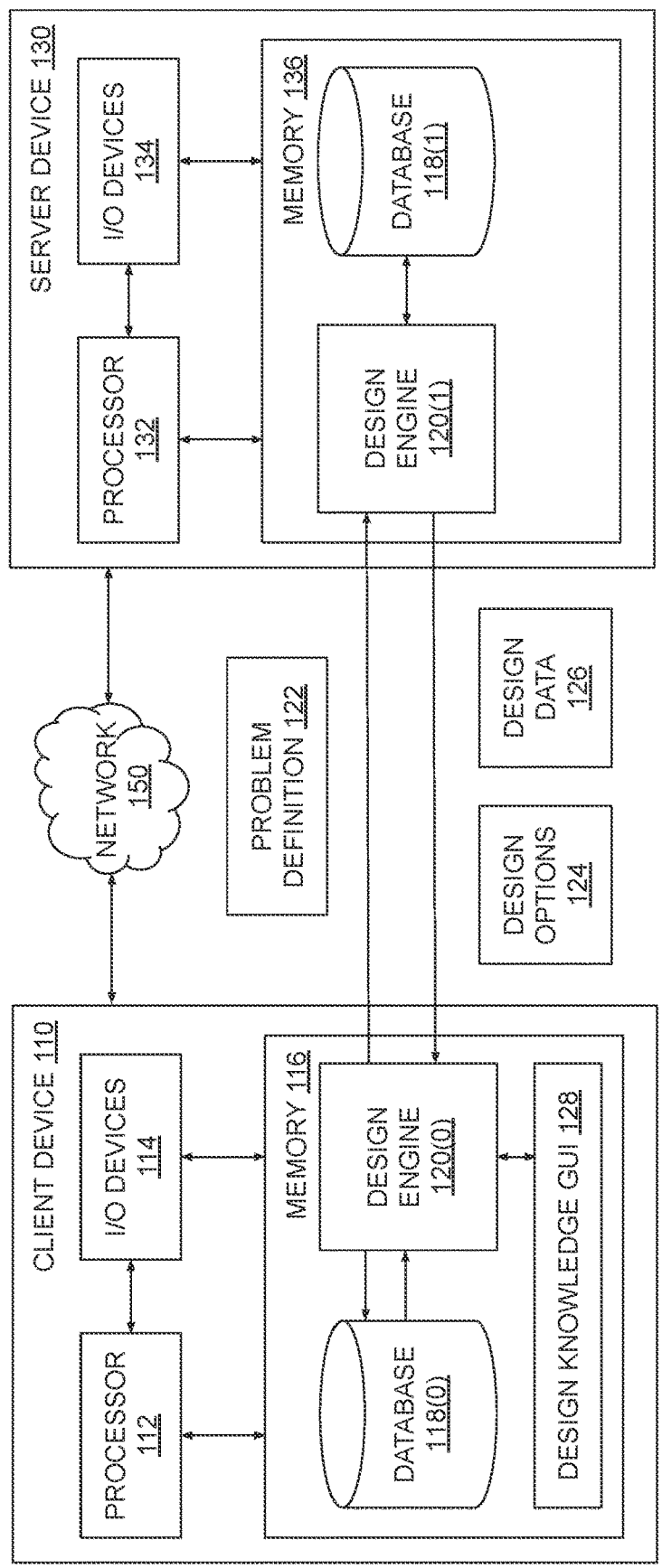
FIG. 1 illustrates a system configured to implement one or more aspects of the present embodiments.

In the following description, numerous specific details are set forth to provide a more thorough understanding of the various embodiments. However, it will be apparent to one skilled in the art that the inventive concepts may be practiced without one or more of these specific details.

As noted above, conventional algorithmic techniques for generating CAD assemblies operate automatically and therefore obfuscate the design process from a user. The user thus has a reduced ability to develop design knowledge that reflects an intuitive understanding of how successful designs are structured. Conventional CAD application GUIs do not expose any such design knowledge to the user and simply present the user with automatically-generated CAD assemblies for inspection. Without an effective way to develop this design knowledge, the user may not be able to effectively make informed decisions regarding how to modify designs and/or how to explore alternative designs and may not be able to communicate effectively with others during collaborative design.

To address these issues, a design engine implements a probabilistic approach to generating designs that exposes automatically-generated design knowledge to the user during operation via one or more graphical user interfaces. The design engine initially generates a population of designs based on a problem definition associated with a design problem. The design engine simulates the performance of each design and then selects the most performant designs. By analyzing the most performant designs, the design engine identifies design variables that are dependent on one another. The design engine then generates a probability model indicating conditional probabilities between design values associated with dependent design variables. The design engine iteratively samples the probability model to generate a subsequent population of designs. The design engine performs this design process repeatedly to generate successive populations of designs.

In conjunction with the above design process, the design engine generates a design knowledge GUI that graphically exposes various types of design knowledge to the user. In particular, the design engine generates a design variable dependency GUI that visualizes various dependencies between designs variables. The design engine also generates a design evolution GUI that animates the evolution of designs across successive design populations. Additionally, the design engine generates a design exploration GUI that facilitates the user exploring various statistical properties of automatically-generated designs.

At least one technological advantage of the disclosed techniques relative to the prior art is that the design engine exposes design knowledge to the user via the design knowledge GUI when automatically generating designs rather than obfuscating this design knowledge from the user, which occurs with conventional CAD application GUIs. This exposure facilities the user in developing an intuitive understanding of how successful designs are constructed and structured. As a result, the design knowledge GUI empowers the user to make informed decisions regarding how to modify designs and/or how to explore alternative design options in a manner that is not possible with conventional CAD application GUIs. Based on the design knowledge provided by the design engine, the user can more easily communicate with others about various aspects and properties of automatically-generated designs, thereby facilitating enhanced collaboration between users. The disclosed techniques can thus be applied to automatically generate numerous designs for mechanical assemblies in a streamlined manner, without preventing the user from obtaining useful design knowledge and understanding, as is typical with prior art algorithmic techniques and GUIs. These technological advantages represent one or more technological advancements over prior art approaches.

System Overview

FIG. 1 illustrates a system configured to implement one or more aspects of the present invention. As shown, a system 100 includes one or more clients 110 and one or more servers 130 coupled together via a network 150. A given client 110 or a given server 130 may be any technically feasible type of computer system, including a desktop computer, a laptop computer, a mobile device, a virtualized instance of a computing device, a distributed and/or cloud-based computer system, and so forth. Network 150 may be any technically feasible set of interconnected communication links, including a local area network (LAN), wide area network (WAN), the World Wide Web, or the Internet, among others.

As further shown, a client 110 includes a processor 112, input/output (I/O) devices 114, and a memory 116, coupled together. Processor 112 includes any technically feasible set of hardware units configured to process data and execute software applications. For example, processor 112 could include one or more central processing units (CPUs). I/O devices 114 include any technically feasible set of devices configured to perform input and/or output operations, including, for example, a display device, a keyboard, and a touchscreen, among others.

Memory 116 includes any technically feasible storage media configured to store data and software applications, such as, for example, a hard disk, a random-access memory (RAM) module, and a read-only memory (ROM). Memory 116 includes a database 118 and a design engine 120(0). Design engine 120(0) is a software application that, when executed by processor 112, interoperates with a corresponding software application executing on server 130, as described in greater detail below.

Server 130 includes a processor 132, I/O devices 134, and a memory 136, coupled together. Processor 132 includes any technically feasible set of hardware units configured to process data and execute software applications, such as one or more CPUs. I/O devices 134 include any technically feasible set of devices configured to perform input and/or output operations, such as a display device, a keyboard, or a touchscreen, among others.

Memory 136 includes any technically feasible storage media configured to store data and software applications, such as, for example, a hard disk, a RAM module, and a ROM. Memory 136 includes a database 118(0) and a design engine 120(1). Design engine 120(1) is a software application that, when executed by processor 132, interoperates with design engine 120(0).

As a general matter, database 118(0) and 118(1) represent separate portions of a distributed storage entity. Thus, for simplicity, databases 118(0) and 118(1) are collectively referred to hereinafter as database 118. Similarly, design engine 120(0) and design engine 120(1) represent separate portions of a distributed software entity that is configured to perform any and all of the inventive operations described herein. Thus, for simplicity, design engines 120(0) and 120(1) are collectively referred to hereinafter as design engine 120.

In operation, design engine 120 is configured to generate a problem definition 122 based on interactions with a user. Problem definition 122 includes various data that defines, at least in part, an engineering problem to be addressed by a mechanical assembly. For example, problem definition 122 could include geometry associated with the engineering problem, a set of design variables associated with the engineering problem, a set of design objectives associated with the engineering problem, and/or a set of design constraints associated with the engineering problem, among others. An exemplary problem definition is described below in conjunction with FIG. 2A. Based on problem definition 122, design engine 120 generates one or more design options 124. A given design option 124 defines a CAD assembly that addresses, at least to some degree, the engineering problem defined via problem definition 122. Design engine 120 also generates design data 126. Design data 126 includes various statistical information design engine 120 generates during automatic generation of design options 124. Based on design data 126, design engine 120 generates a design knowledge GUI 128 that can be displayed to the user via a display device. Design knowledge GUI 128 includes three different GUIs that convey the above-mentioned statistical information to the user. These three GUIs are described in greater detail below in conjunction with FIG. 3 and in conjunction with FIGS. 4-5, 6-7, and 8-9, respectively.

Exemplary Problem Definition and Design Option

Figure 2A:
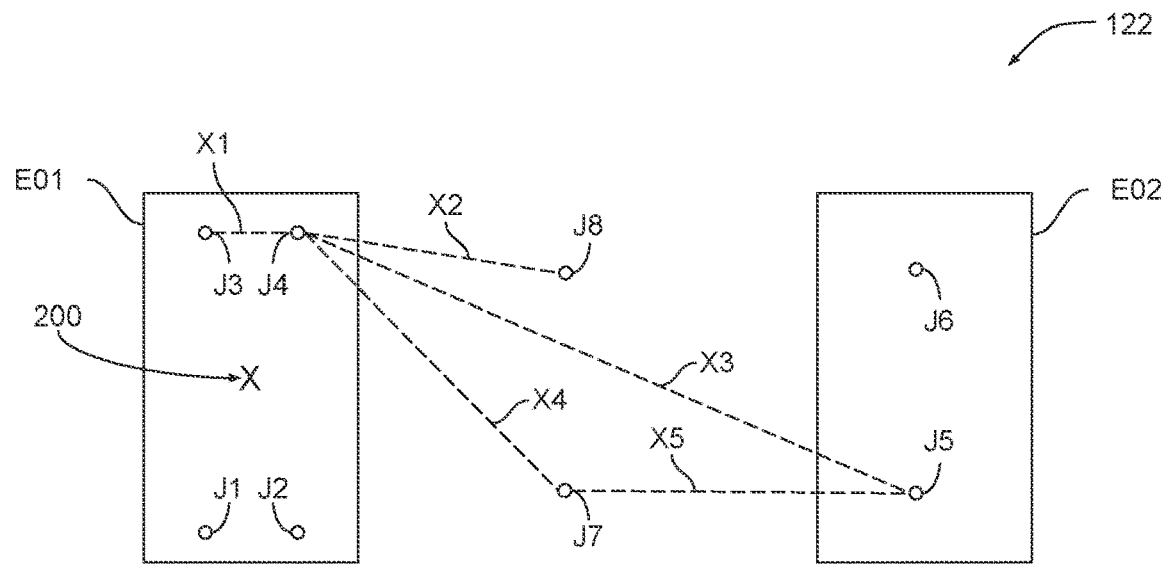
FIG. 2A is an exemplary illustration of the design problem of FIG. 1, according to various embodiments.

FIG. 2A is an example of the design problem of FIG. 1, according to various embodiments. As shown, design problem 122 includes an environmental object 1 (EO1), an environmental object 2 (EO2), joints J1 through J8, design variables X1 through X5, and design objective 200. EO1 and EO2 represent pre-existing 3D geometry associated with the engineering problem. In the example shown, EO1 could be the chassis of an automobile, while EO2 could be a wheel of the automobile that needs to be coupled to the automobile chassis by a mechanical assembly of some sort.

Joints J1 through J8 represent specific points to which components can be coupled to generate CAD assemblies. Those components could include beams, springs, dampers, and so forth. A given joint can be assigned a specific joint type, although a specific assignment of joint type can be omitted. Joints J1 through J8 are initially positioned by the user via interactions with design engine 120. The user can also define, via interactions with design engine 120, one or more design objectives, such as design objective 200. Design objective 200 defines a target set of dynamics that a given CAD assembly should achieve at a location on EO1 corresponding to design objective 200. For example, design objective 200 could define a target time-varying acceleration that a given CAD assembly should achieve at the location on EO1 corresponding to design objective 200. Design problem 122 can include any number of design objectives associated with any set of positions. Design problem 122 can also include one or more design objectives that are not associated with any particular position. For example, a given design objective could indicate that the total number of components should be minimized.

Design variables X1 through X5 represent exemplary design variables to which design engine 120 assigns specific values when generating a design. The value assigned to a given design variable may be referred to herein as a "design value." In practice, design engine 120 implements a different design variable for each different pair of joints, although for clarity only exemplary design variables X1 through X5 are shown. Design engine 120 assigns a given design value to a given design variable to represent a specific component type that can couple together two joints, as described in greater detail below in conjunction with FIG. 2B.

Figure 2B:
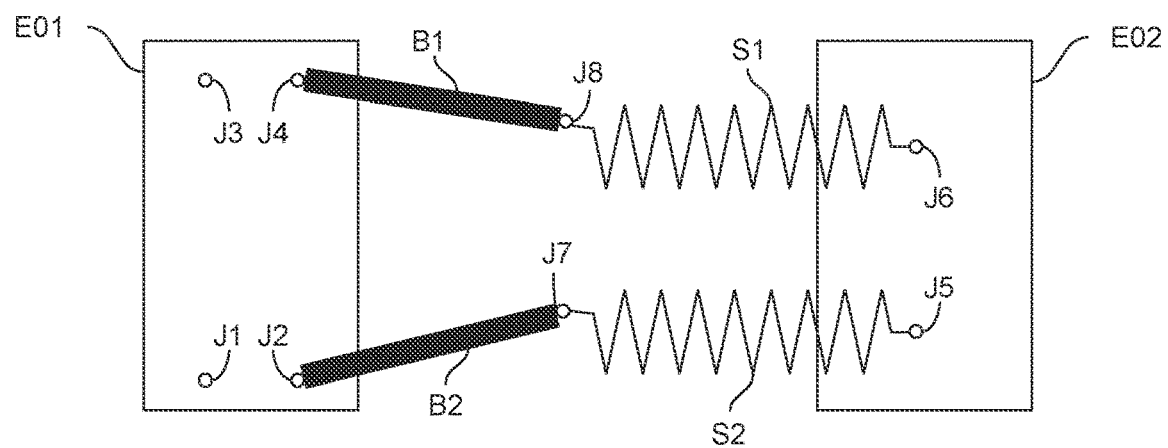
FIG. 2B is an exemplary illustration of one of the design options of FIG. 1, according to various embodiments.

FIG. 2B is an example of one of the design options of FIG. 1, according to various embodiments. As shown, design option 124 includes beam B1 coupled between joints J4 and J8, beam B2 coupled between joints J2 and J7, spring S1 coupled between joints J8 and J6, and spring S2 coupled between joints J7 and J5. The various beams and springs shown, and the particular couplings of those components to specific joints, collectively represent a CAD assembly that may address the engineering problem set forth in problem definition 122, at least to some degree.

To generate design option 124, design engine 120 assigns specific values to the various design variables associated with problem definition 122 to represent specific types of components. For example, design engine 120 could assign a value of "1" to design variable X2 to represent beam B1. Design engine 120 could assign a value of "0" to design variable X3 to indicate the absence of a component. Design engine 120 could assign a value of "2" to design variable X5 to represent spring S2. Design engine 120 may also assign values to other design variables in order to represent the positioning and/or joint type associated with joints J1 through J8, in some embodiments.

Design engine 120 is configured to implement a statistically-driven design process to generate design values for design options 124 in conjunction with generating design data 126, as described in greater detail below in conjunction with FIG. 3.

Software Overview

Figure 3:
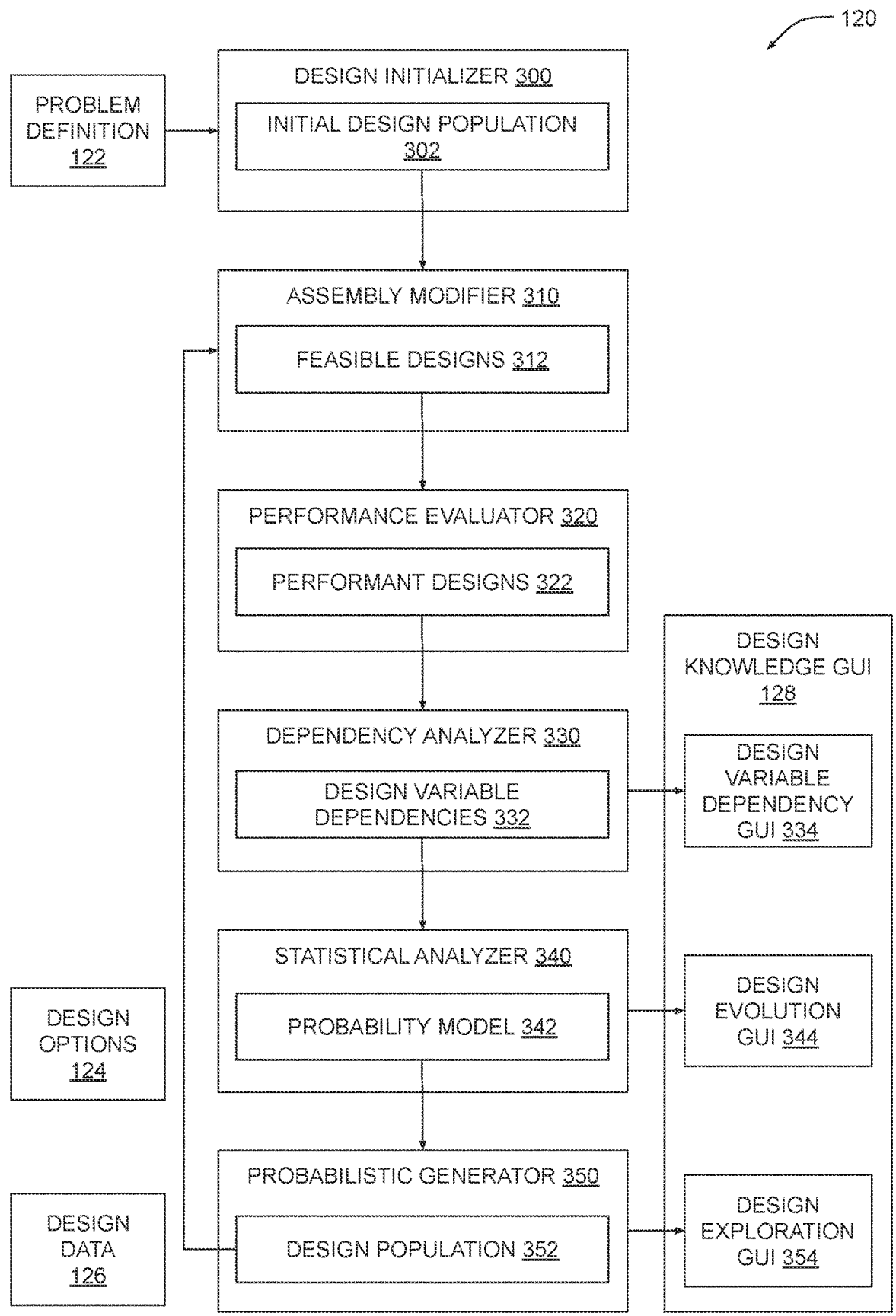
FIG. 3 is a more detailed illustration of the design engine of FIG. 1, according to various embodiments.

FIG. 3 is a more detailed illustration of the design engine of FIG. 1, according to various embodiments. As shown, design engine 120 includes a design initializer 300, an assembly modifier 310, a performance evaluator 320, a dependency analyzer 330, a statistical analyzer 340, and a probabilistic generator 350.

In operation, design initializer 300 generates an initial design population 302 of randomized designs based on problem definition 122. A given design included in initial design population 302 includes a randomly selected or randomly omitted component for each pair of joints set forth in problem definition 122. As mentioned, a given component could be, for example, a beam, spring, a damper, and any other technically feasible mechanical component. Each design included in initial design population 302 also includes a randomly selected joint type for each joint. A given joint type could be, for example, a ball joint, a slider joint, an elbow joint, and so forth. Components and joints may be collectively referred to herein as "design elements."

In practice, design initializer 300 generates a given design included in initial design population 302 by assigning random values to each design variable associated with the given design, thereby generating a specific set of design elements. For example, design initializer 300 could assign a value of "1" to design variable X2 of FIG. 2A in order to indicate that the corresponding component should be a beam component or assign a specific value to another design variable to indicate that a corresponding joint should have a given joint type.

Assembly modifier 310 processes each design included in initial design population 302 in order to identify and repair any infeasible designs. Assembly modifier 310 then outputs feasible designs 312 that include any initially feasible designs as well as any repaired designs. As referred to herein, the term "infeasible" is used to describe designs that violate certain design rules. For example, a design for an assembly that includes one or more components that are not attached to joints at both ends could be considered infeasible, because such "dangling" components do not contribute to the overall functionality of the design. In another example, a design for an assembly that includes too many components connected to the same joint could be considered infeasible because a real-world joint can only handle a maximum number of connections. Assembly modifier 310 identifies infeasible designs and then implements a constraint-oriented programming approach to modify those designs.

Performance evaluator 320 simulates the dynamic behavior of feasible designs 312 to generate performance data that indicates the degree to which each feasible design 312 meets the various design objectives set forth in problem definition 122. Performance evaluator 320 ranks feasible designs 312 based on the associated performance data and selects the best-performing designs, which are shown as performant designs 322. Performance evaluator 320 may select the top N performing designs, N being an integer, or select the top N % designs, N being a decimal, among other approaches to selecting the best-performing designs.

Dependency analyzer 330 processes each performant design 322 and determines various statistical dependencies between design variables, thereby generating design variable dependencies 332. Design variable dependencies 332 constitute a portion of the statistical information included in design data 126. Dependency analyzer 330 can determine that two design variables depend on one another by comparing the expected probabilities of those two design variables having specific values to the observed probabilities of those two design variables having specific values. Dependency analyzer 330 can quantify the dependencies between design variables using various statistical approaches.

In one embodiment, dependency analyzer 330 may implement a chi-squared test to generate a chi-squared value for a given pair of design variables, where the chi-squared value quantifies the statistical dependency between the given pair of design variables. Dependency analyzer 330 may then determine that a pair of design variables are dependent on one another when the associated chi-squared value exceeds a threshold. Dependency analyzer 330 may also account for missing observations when implementing this approach by selecting different thresholds against which each chi-squared value is compared based on how many observations are missing.

Based on design variable dependencies 332, dependency analyzer 330 generates a design variable dependency GUI 334 that is included in design knowledge GUI 128. Design variable dependency GUI 334 visually quantifies statistical dependencies between various design variables, thereby providing the user with insight into how the various design elements within a successful design relate to one another. Design variable dependency GUI 334 is described in greater detail below in conjunction with FIGS. 4-5.

Statistical analyzer 340 analyzes performant designs 322 and design variables dependencies 332 to generate a probability model 342. Probability model 342 constitute another portion of the statistical information included in design data 126. Conceptually, probability model 342 indicates various probabilities of certain design elements occurring in designs that are considered high-performing. More specifically, probability model 342 includes a set of conditional probability values associated with each pair of design variables that are determined, via dependency analyzer 330, to be statistically dependent on one another. The set of conditional probabilities includes a different conditional probability value for each different combination of design values that can be assigned to the pair of design variables. For example, suppose dependency analyzer 330 determines that design variables X10 and X11 are statistically dependent on one another via the approach described previously. Statistical analyzer 340 could generate a set of conditional probability values indicating the probability of design variable X10 being assigned a value of "2" (indicating, e.g., a beam component), conditioned on the probability of design variable X11 being assigned a value of "1" (indicating, e.g., a ball joint).

In one embodiment, probability model 342 is a two-dimensional (2D) matrix of values with rows that correspond to "parent" elements and columns that correspond to "child" elements. Parent and child elements correspond to design variables that are determined to be statistically dependent on one another. A given cell included in the 2D matrix of values stores a conditional probability value that indicates the probability of a child design variable being assigned a specific value conditioned on the probability of the parent design variable being assigned a specific value.

Based on probability model 342, statistical analyzer 340 generates a design evolution GUI 344 that is included in design knowledge GUI 128. Design evolution GUI 344 animates how the probabilities of various design elements being included in successful designs changes over successive populations of designs, thereby providing the user with insight into how the design process unfolds. Design evolution GUI 344 is described in greater detail below in conjunction with FIGS. 6-7.

Probabilistic generator 350 is configured to generate design population 352 based on samples extracted from probability model 342. In order to generate a given design included in design population 352, probabilistic generator 350 assigns specific values to the design variables included in the given design with a probability distribution that is derived from probability model 342. In this manner, probabilistic generator 350 can generate new populations of designs that have design variable values derived from high-performing designs included in previous populations of designs. Probabilistic generator 350 also generates design data 126 based on design variable dependencies 332, probability model 342, and design population 352.

If certain convergence criteria are met, probabilistic generator 350 outputs the newly-generated population of designs as design options 124. Otherwise, probabilistic generator 350 provides design population 352 to assembly modifier 310 and the above-described process repeats. The convergence criteria could indicate, for example, a maximum number of iterations to perform or a maximum amount of time to execute, among others.

In one embodiment, probabilistic generator 350 may implement a Gibbs sampling technique to sample probability model 342 when generating a new design to include in design population 352. In so doing, probabilistic generator 350 randomly assigns values to the various design variables associated with the design and then updates these values based on probability values sampled from probability model 342. By repeating this process across one or more iterations, the values assigned to the design variables may eventually converge to having the probability distribution set forth in probability model 342.

Based on probability model 342 and design population 352, probabilistic generator 350 generates a design exploration GUI 354 that is included in design knowledge GUI 128. Design exploration GUI 354 allows the user to interact with designs in order to expose various statistical relationships between design elements included in those designs, thereby facilitating user exploration of design knowledge. Design exploration GUI 354 is described in greater detail below in conjunction with FIGS. 8-9.

Via the above operations, design engine 120 estimates probability distributions of design variable values associated with high-performing designs across increasingly performant design populations and then uses these probability distributions to generate subsequent design populations. In practice, this approach can converge quickly to generate design options 124 faster than possible with conventional generative design techniques, such as generative design and constraint-oriented programming techniques, among others. During this design process, design engine 120 also generates the various GUIs included in design knowledge GUI 128. These different GUIs expose specific design knowledge to the user and therefore facilitate the user in developing an intuitive understanding of how successful and high-performing designs are structured. These different GUIs are described in greater detail below in conjunction with FIGS. 4-9.

Design Variable Dependency GUI

Figure 4:
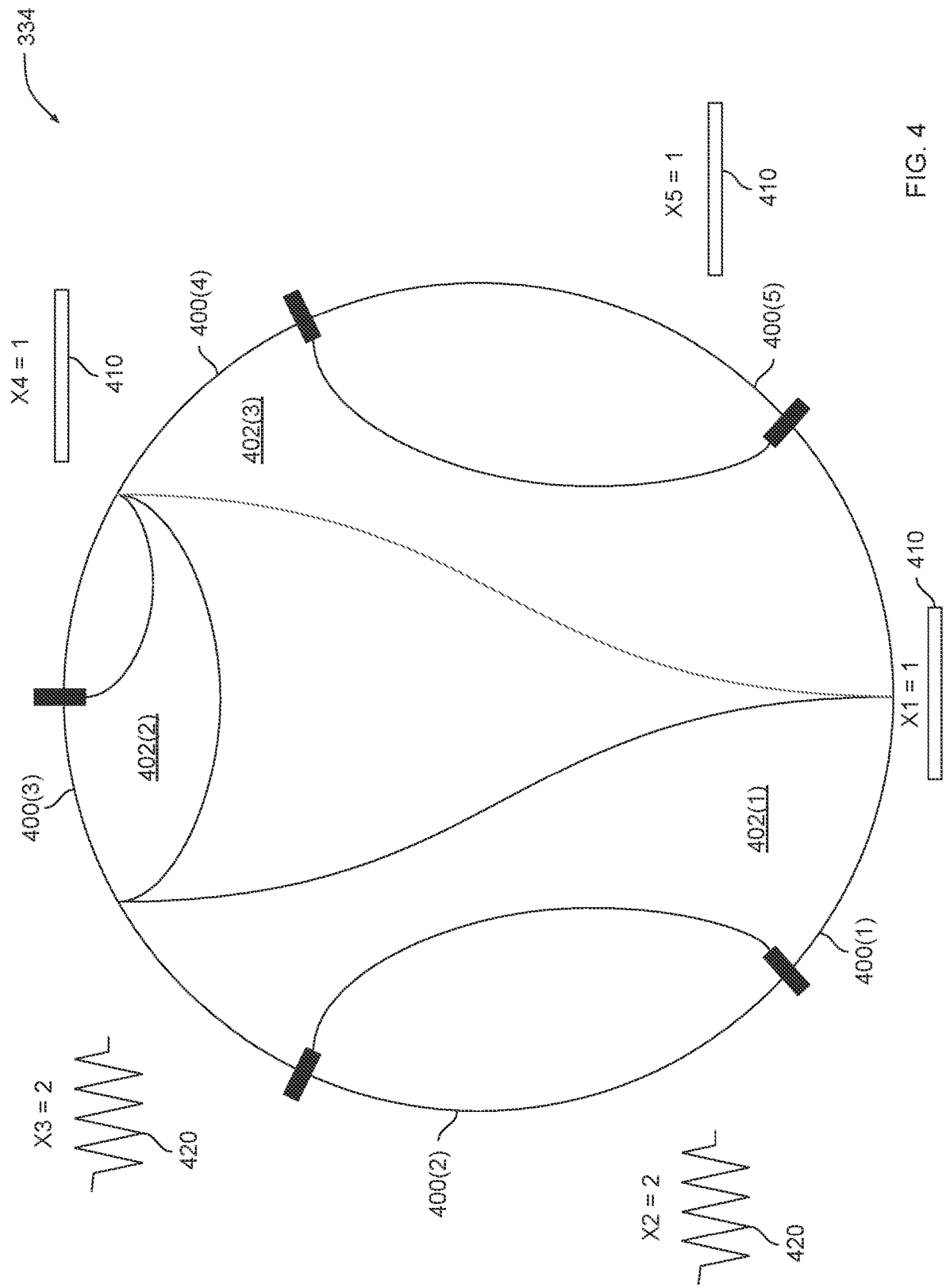
FIG. 4 is an exemplary illustration of the design variable dependency graphical user interface of FIG. 3, according to various embodiments.

FIG. 4 is an exemplary illustration of the design variable dependency GUI of FIG. 3, according to various embodiments. As shown, design variable dependency GUI 334 includes a perimeter that is divided into sections 400(1) through 400(5). Each one of sections 400(1) through 400(5) corresponds to a different design variable X1 through X5, respectively. Portions of some sections 400 are coupled together via chords 402. In particular, a portion of section 400(1) is coupled to a portion of section 400(3) by chord 402(1), a portion of section 400(3) is coupled to a portion of section 400(4) by chord 402(2), and a portion of section 400(4) is coupled to a portion of section 400(1) by chord 402(3).

Chords 402 visual represent statistical dependencies between various design variables. For example, chord 402(1) could visually represent a statistical dependency between design variable X1 and design variable X3. Chords 402 may also, in some embodiments, visually represent statistical dependencies between specific design values that can be assigned to those design variables. For example, chord 402(1) could visually represent a statistical dependency between design variable X1 being assigned a value of "1" (corresponding to a beam element 410) and design variable X3 being assigned a value of "2" (corresponding to a spring element 420). Chords 402 can have varying thicknesses to represent varying strengths of statistical dependencies between design variables and/or design values. For example, chord 402(1) is thicker than chord 402(2), indicating that design variables X1 and X5 have a greater statistical dependency on one another than design variables X3 and X4.

Via the approach described above, design variable dependency GUI 334 conveys design knowledge to the user indicating how successful designs can be structured. Accordingly, design variable dependency GUI 334 facilitates the user developing an intuition regarding the interrelationships between the various design elements included in each design. Dependency analyzer 330 generates design variable dependency GUI 334 via the approach described below in conjunction with FIG. 5.

Figure 5:
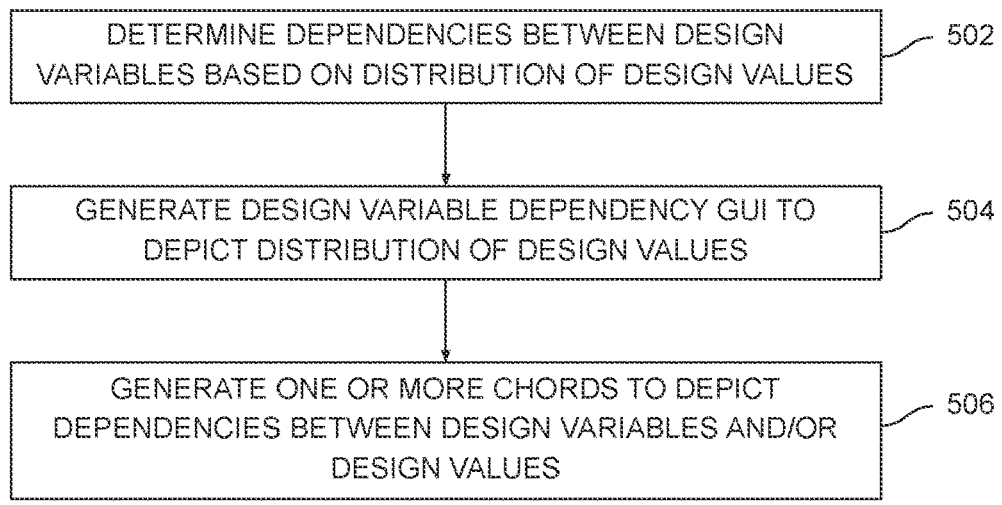
FIG. 5 is a flow diagram of method steps for visualizing design variable dependencies, according to various other embodiments.

FIG. 5 is a flow diagram of method steps for visualizing design variable dependencies, according to various other embodiments. Although the method steps are described in conjunction with the systems of FIGS. 1-4, persons skilled in the art will understand that any system configured to perform the method steps in any order falls within the scope of the present embodiments.

As shown, a method 500 begins at step 502, where dependency analyzer 330 within design engine 120 determines one or more statistical dependencies between design variables based on a distribution of design values within a population of successful designs. Dependency analyzer 330 can determine that two design variables depend on one another by comparing the expected probabilities of those two design variable having specific values to the observed probabilities of those two design variables having specific values. In one embodiment, dependency analyzer 330 implements a chi-squared test across design variable values to determine statistical dependencies between design variables.

At step 504, dependency analyzer 330 generates design variable dependency GUI 334 to depict the distribution of design values across the various design variables associated with problem definition 122. Dependency analyzer 330 arranges the design variables around a circular perimeter and then assigns each design variable to a different section of that perimeter. Dependency analyzer 330 may allocate a larger section of the perimeter to a design variable with greater statistical dependencies on other design variables.

At step 506, dependency analyzer 330 generates one or more chords that traverse design variable dependency GUI 332 and couple together sections of the perimeter associated with design variables that are statistically dependent on one another. A given chord may also indicate a statistical dependency between specific values that can be assigned to the design variables. Dependency analyzer 330 generates each chord to have a thickness that represents the strength of the statistical dependency between design variables and/or design values.

Referring generally to FIGS. 4-5, the techniques described herein advantageously can be applied to provide the user with design knowledge generated via the probabilistic approach to generating designs described above in conjunction with FIG. 3. These techniques therefore facilitate the user in developing an understanding of how successful designs can be structured, thereby empowering the user to make informed design changes and to more effectively communicate with others regarding designs.

Design Evolution GUI

Figure 6A:
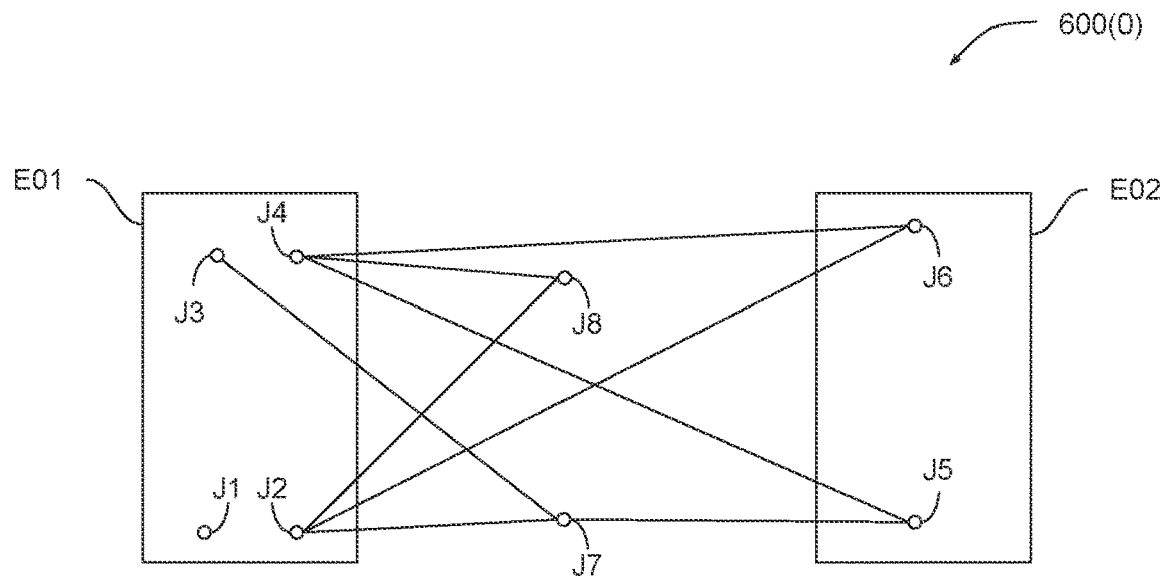
FIG. 6A-6D set forth exemplary illustrations of the design evolution graphical user interface of FIG. 3, according to various embodiments.
Figure 6B:
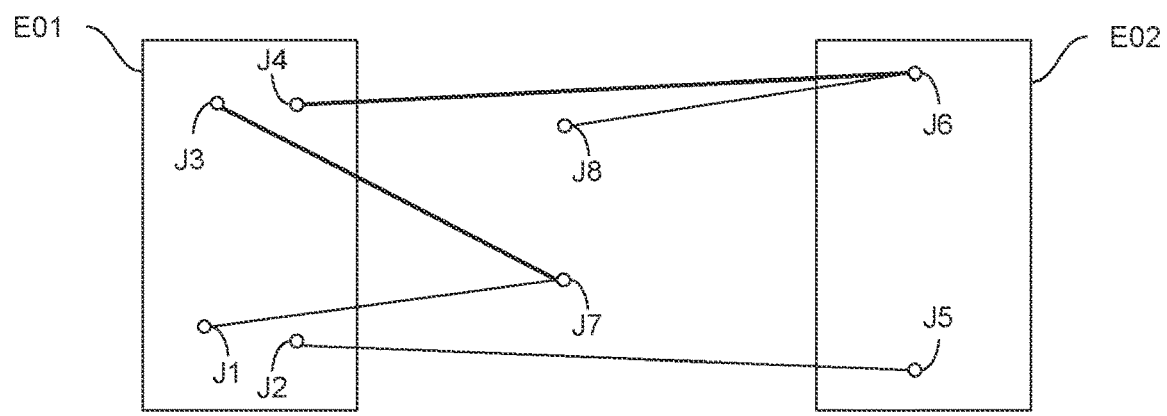
Figure 6C:
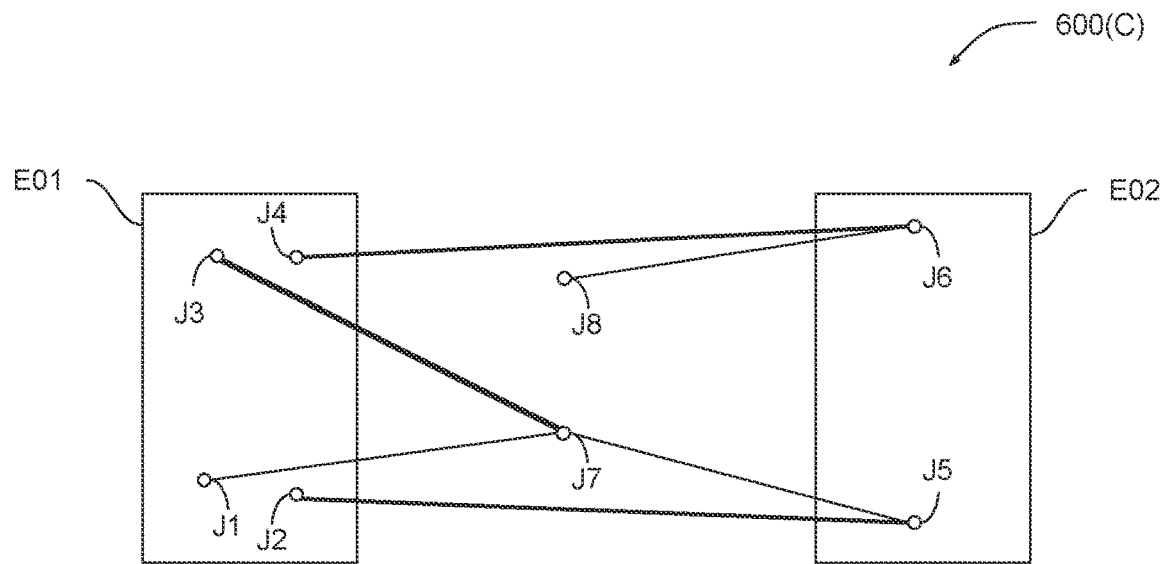
Figure 6D:
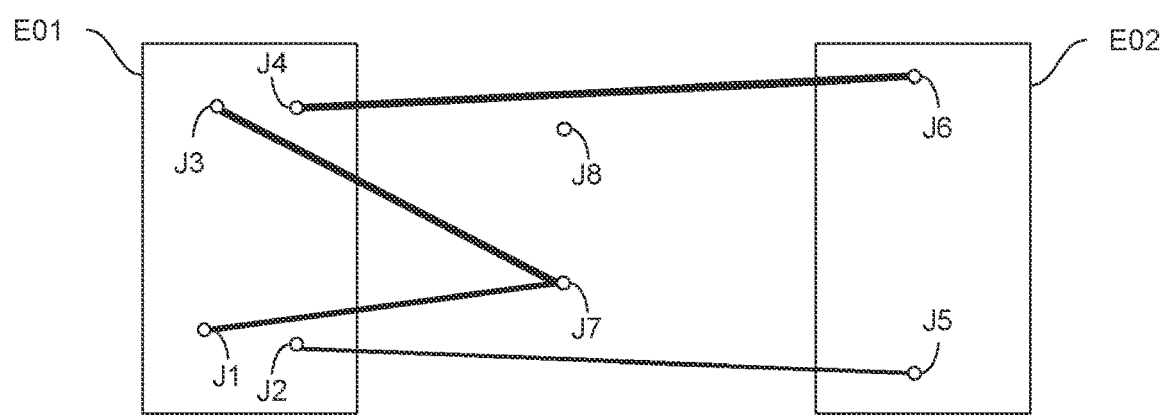

FIG. 6A-6D set forth exemplary illustrations of the design evolution GUI of FIG. 3, according to various embodiments. FIG. 6A depicts frame 600(A), FIG. 6B depicts frame 600(B), FIG. 6C depicts frame 600(C), and FIG. 6D depicts frame 600(D). Statistical analyzer 340 generates each frame 600 during a given design iteration in order to visually depict the distribution of design variable values in the design population corresponding to that iteration.

A given frame 600 depicts a set of components that couple together the different joints set forth in problem definition 122. For a given component that couples together a given pair of joints, design evolution GUI 344 displays the given component with specific visual properties that represent the probability of the component coupling together the given pair of joints. In the exemplary frames 600 shown in FIGS. 6A-6D, components are shown as lines with thicknesses that correspond to probabilities of those components appearing between a corresponding pair of joints. In various embodiments, components may also be shown with different translucency values to represent different probabilities and/or different colors to represent specific component types that are most likely to occur.

Referring now to FIG. 6A, initially, design evolution GUI 344 displays many different possible configurations of components that can couple together the various joints. The different components are shown with similar line thicknesses, indicating that none of the components occur more frequently in the current design population than any others. Referring now to FIG. 6B, after one design iteration, design evolution GUI 344 displays fewer possible configurations of components, and some components are more likely to occur in the current design population that others. Referring now to FIG. 6C, after another design iteration, design evolution GUI 344 displays even fewer possible configurations of components, with specific components having a distinctly greater likelihood of occurring in the design population that others. Referring now to FIG. 6D, in the final design iteration, the distribution of design variable values in the final design population converges to a handful of components that occur with high likelihood. During the above process, statistical analyzer 340 analyzes the distribution of design variable values associated with each design population and updates design evolution GUI 344 accordingly.

Because design evolution GUI 344 graphically depicts how the design process unfolds over time, design evolution GUI 344 helps the user to understand how successive design populations change to arrive at the final design population. This approach differs from conventional algorithmic approaches to generating designs that obfuscate the design process from the user. The techniques implemented by statistical analyzer 340 when generating design evolution GUI 344 are described in greater detail below in conjunction with FIG. 7.

Figure 7:
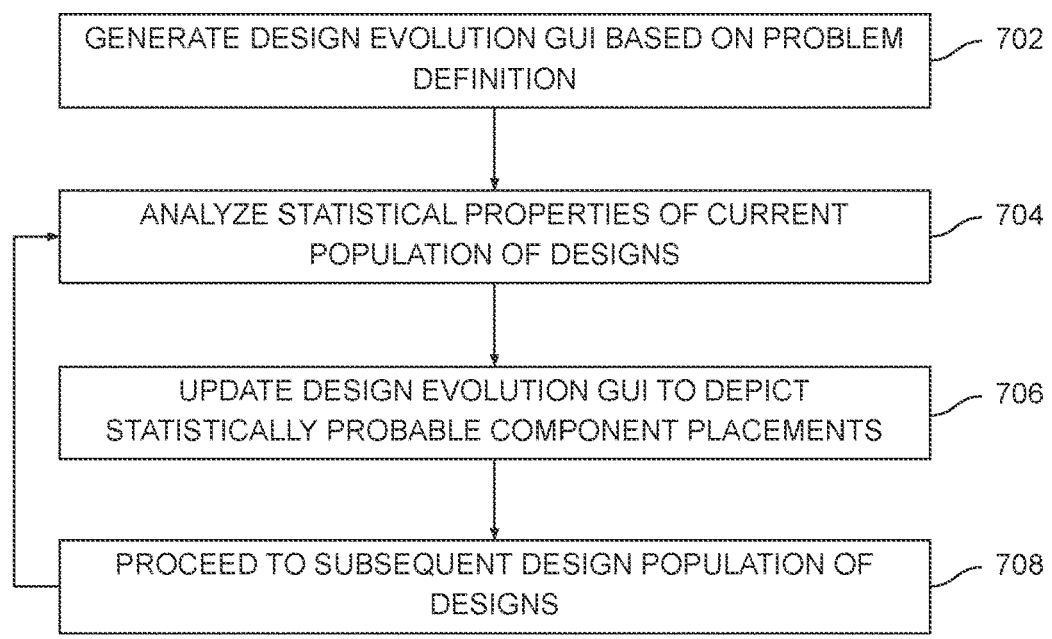
FIG. 7 is a flow diagram of method steps for visualizing the evolution of a design population, according to various other embodiments.

FIG. 7 is a flow diagram of method steps for visualizing the evolution of a design population, according to various other embodiments. Although the method steps are described in conjunction with the systems of FIGS. 1-3 and 6, persons skilled in the art will understand that any system configured to perform the method steps in any order falls within the scope of the present embodiments.

As shown, a method 700 begins at step 702, where statistical analyzer 340 within design engine 120 of FIG. 3 generates design evolution GUI 344 based on problem definition 122. Design evolution GUI 344 graphically depicts various elements of problem definition 122, including any environmental objects defined in problem definition 122 and various joints specified in problem definition 122. Based on problem definition 122, design engine 120 generates a current population of designs in the manner described above in conjunction with FIG. 3.

At step 704, statistical analyzer 340 analyzes the statistical properties of the current population of designs to determine the distribution of design values assigned to the design variables set forth in problem definition 122. For example, statistical analyzer 340 could determine the frequency with which a specific component type couples together a particular set of joints across all designs included in the current design population.

At step 706, statistical analyzer 340 updates design evolution GUI 344 to depict statistically probable component placements. In so doing, design evolution GUI 344 displays a given component with visual properties that represent the probability of the component appearing in the depicted location. Design evolution GUI 344 can also display a given component with visual properties that indicate the most likely component type assigned to the given component.

At step 708, statistical analyzer 340 proceeds to analyzing a subsequent population of designs. The method 700 then returns to step 704 and continues iteratively, thereby generating an animation that depicts how the probability distribution of design variables evolves over successive design iterations.

Referring generally to FIGS. 6-7, the disclosed techniques provide the user with detailed insight into how the design process evolves over many design populations. Accordingly, the disclosed techniques can be applied to help the user develop an intuition regarding how successful designs are generated.

Design Exploration GUI

Figure 8A:
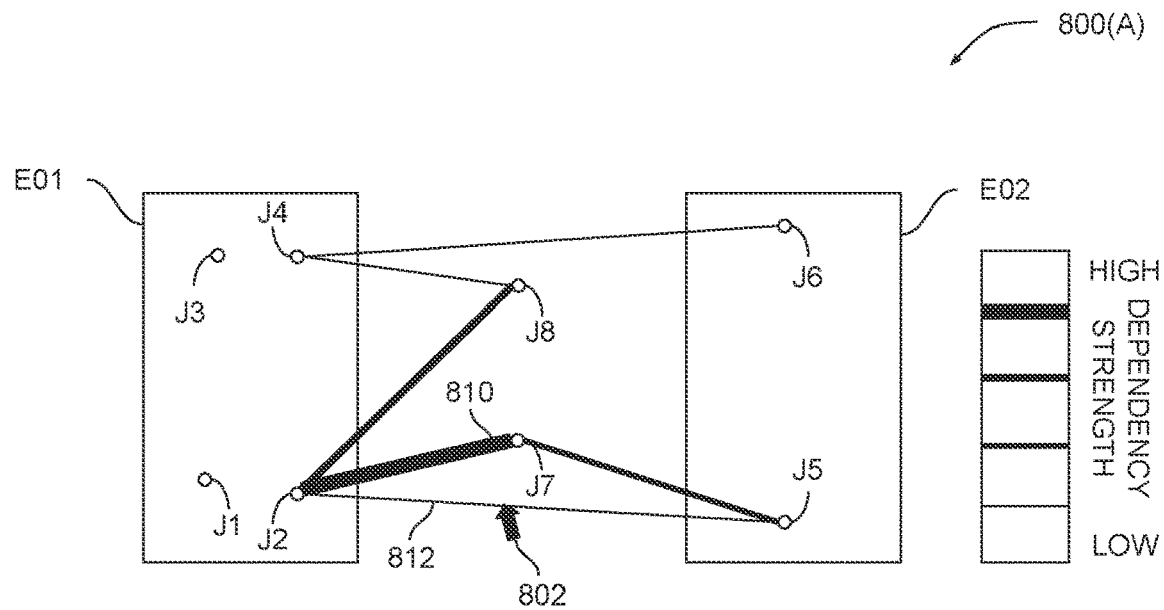
FIG. 8A-8B set forth exemplary illustrations of the design exploration graphical user interface of FIG. 3, according to various embodiments.
Figure 8B:
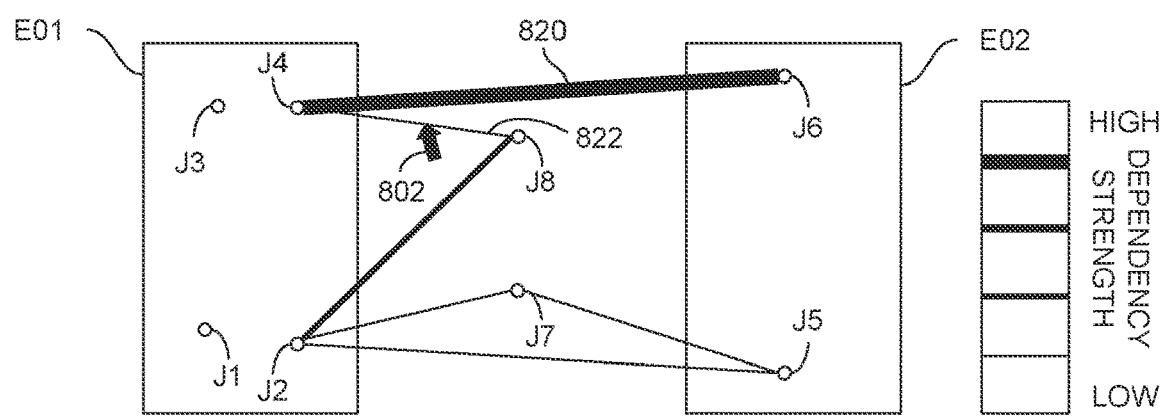

FIG. 8A-8B set forth exemplary illustrations of the design exploration GUI of FIG. 3, according to various embodiments. As shown, view 800(A) of FIG. 8A and view 800(B) of FIG. 8B depict joints J1 through J8 coupled together via various components. Design exploration GUI 354 displays a given component within views 800(A) and 800(B) with specific visual attributes that indicate the statistical dependency of the given component on a component the user selects via a cursor 802.

For example, referring now to FIG. 8A, design exploration GUI 354 displays component 810 with an elevated thickness that indicates a statistical dependency on a user-selected component 812. Similarly, referring now to FIG. 8B, design exploration GUI 354 displays component 820 with an elevated thickness that indicates a statistical dependency on a user-selected component 822. In practice, design exploration GUI 354 can display the various generic components shown in FIGS. 8A-8B as specific component types, such as beams, springs, dampers, and so forth. Further, design exploration GUI 354 can display components with a variety of different visual properties to indicate a statistical dependency on a user-selected component, including different colors, translucencies, and so forth. In one embodiment, the various views 800 associated with design exploration GUI 354 can be superimposed over a graphical rendering of one or more mechanical assembly designs.

Probabilistic generator 350 of FIG. 3 generates design exploration GUI 354 based on design variable dependencies 332 and design population 352. Via the techniques described above, design exploration GUI 354 helps the user to explore designs included in design population 352 and understand how different components of those designs depend on one another. Based on insights and design knowledge gained via interactions with design exploration GUI 354, the user is empowered to make informed design decisions. In one embodiment, probabilistic generator 350 may generate design exploration GUI 354 based on multiple successive design populations. The techniques implemented by probabilistic generator 350 when generating design exploration GUI 354 are described in greater detail below in conjunction with FIG. 9.

Figure 9:
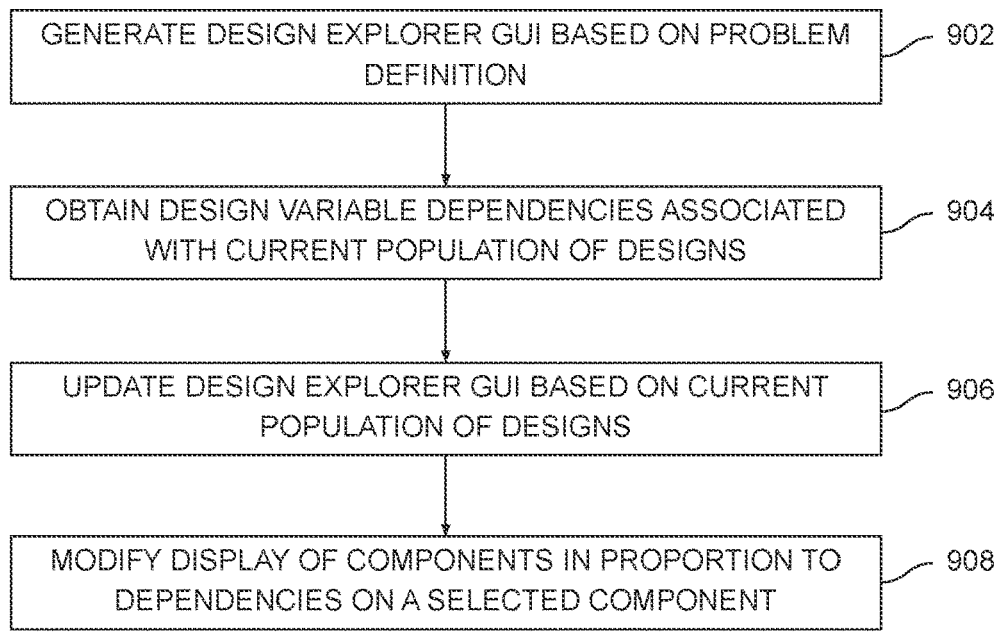
FIG. 9 is a flow diagram of method steps for visualizing one or more aspects of a design, according to various embodiments.

FIG. 9 is a flow diagram of method steps for visualizing one or more aspects of a design, according to various embodiments. Although the method steps are described in conjunction with the systems of FIGS. 1-3 and 8, persons skilled in the art will understand that any system configured to perform the method steps in any order falls within the scope of the present embodiments.

As shown, a method 900 begins at step 902, where probabilistic generator 350 of FIG. 3 generates design explorer GUI 354 based on problem definition 122. Design explorer GUI 354 graphically depicts specific geometry set forth in problem definition 122, including any environmental objects defined in problem definition 122 and various joints specified in problem definition 122. Exemplary views of design explorer GUI 354 are shown in FIGS. 8A-8B.

At step 904, probabilistic generator 350 obtains design variable dependencies 332 generated by dependency analyzer 330. Design variable dependencies 332 indicate statistical dependencies between physically related design variables. As described above in conjunction with FIG. 3, dependency analyzer 330 can determine various statistical dependencies between design variables and corresponding values by performing a chi-squared analysis on the current design population, among other possible techniques.

At step 906, probabilistic generator 350 updates design exploration GUI 354 based on the current population of designs to visually depict some or all components that can couple together joints in the current population of designs. For example, probabilistic generator 350 could project all possible configurations of components set forth in the current population of designs onto design exploration GUI 354.

At step 908, probabilistic generator 350 modifies the display of one or more components displayed in design exploration GUI 354 in proportion to corresponding statistical dependencies on a user-selected component. For example, probabilistic generator 350 could analyze design variable dependencies 332 to determine the statistical dependency of each design variable on the design variable associated with the user-selected component. Probabilistic generator 350 could then modify the translucencies of the components associated with those design variables relative to the determined statistical dependencies.

In sum, a design engine implements a probabilistic approach to generating designs that exposes automatically-generated design knowledge to the user during operation via one or more graphical user interfaces (GUIs). The design engine initially generates a population of designs based on a problem definition associated with a design problem. The design engine simulates the performance of each design and then selects the most performant designs. By analyzing the most performant designs, the design engine identifies design variables that are dependent on one another. The design engine then generates a probability model indicating conditional probabilities between design values associated with dependent design variables. The design engine iteratively samples the probability model to generate a subsequent population of designs. The design engine performs this design process repeatedly to generate successive populations of designs.

In conjunction with the above design process, the design engine generates a design knowledge GUI that graphically exposes various types of design knowledge to the user. In particular, the design engine generates a design variable dependency GUI that visualizes various dependencies between designs variables. The design engine also generates a design evolution GUI that animates the evolution of designs across successive design populations. Additionally, the design engine generates a design exploration GUI that facilitates the user exploring various statistical properties of automatically-generated designs.

At least one technological advantage of the disclosed techniques relative to the prior art is that the design engine exposes design knowledge to the user via the design knowledge GUI when automatically generating designs rather than obfuscating this design knowledge from the user, which occurs with conventional CAD application GUIs. This exposure facilities the user in developing an intuitive understanding of how successful designs are constructed and structured. As a result, the design knowledge GUI empowers the user to make informed decisions regarding how to modify designs and/or how to explore alternative design options in a manner that is not possible with conventional CAD application GUIs. Based on the design knowledge provided by the design engine, the user can more easily communicate with others about various aspects and properties of automatically-generated designs, thereby facilitating enhanced collaboration between users. The disclosed techniques can thus be applied to automatically generate numerous designs for mechanical assemblies in a streamlined manner, without preventing the user from obtaining useful design knowledge and understanding, as is typical with prior art algorithmic techniques and GUIs. These technological advantages represent one or more technological advancements over prior art approaches.

1. Some embodiments include a computer-implemented method for generating designs, the method comprising generating a first plurality of designs based on a problem definition associated with a design problem and a first set of design variables associated with the design problem, analyzing the first plurality of designs statistically to determine a first statistical attribute associated with a first design variable included in the first set of design variables, and generating a graphical user interface (GUI) based on the first statistical attribute and the first plurality of designs to graphically depict the first statistical attribute.

2. The computer-implemented method of clause 1, wherein the first statistical attribute comprises a first statistical dependency between the first design variable and a second design variable that is included in the first set of design variables.

3. The computer-implemented method of any of clauses 1-2, further comprising generating a first GUI element within the GUI that couples a first portion of the GUI associated with the first design variable to a second portion of the GUI associated with the second design variable, wherein the GUI graphically depicts the first statistical attribute via the first GUI element.

4. The computer-implemented method of any of clauses 1-3, further comprising generating a first GUI element within the GUI that includes one or more visual attributes that correspond to a magnitude of the first statistical dependency.

5. The computer-implemented method of any of clauses 1-4, wherein the GUI comprises a first arc associated with the first design variable and a second arc associated with a second design variable included in the first set of design variables, and further comprising generating a first GUI element within the GUI that couples the first arc to the second arc based on the first statistical dependency.

6. The computer-implemented method of any of clauses 1-5, wherein the GUI includes a first GUI element that is coupled to a first portion of the problem definition that is associated with the first design variable and includes a second GUI element that is coupled to a second portion of the problem definition that is associated with the second design variable, wherein the GUI graphically depicts the first statistical attribute via the first GUI element.

7. The computer-implemented method of any of clauses 1-6, wherein the first statistical attribute comprises a first probability of the first design variable being assigned a first design value in the first plurality of designs.

8. The computer-implemented method of any of clauses 1-7, further comprising generating a first GUI element within the GUI with at least one visual attribute that is derived from the first probability, wherein the GUI graphically depicts the first statistical attribute via the first GUI element.

9. The computer-implemented method of any of clauses 1-8, further comprising generating a second plurality of designs based on the first probability and the first set of design variables, analyzing the second plurality of designs statistically to determine a second statistical attribute associated with the first design variable, and modify the GUI based on the second statistical attribute and the second plurality of designs to graphically depict the second statistical attribute.

10. The computer-implemented method of any of clauses 1-9, further comprising generating a first probability distribution associated with a first set of design values assigned to the first set of design variables, extracting one or more samples from the first probability distribution, generating a second plurality of designs based on the one or more samples, wherein the second plurality of designs includes a second set of design values assigned to the first set of design variables, and modifying the GUI based on the second set of design values to graphically depict at least one statistical attribute of the second set of design values.

11. Some embodiments include a non-transitory computer-readable medium storing program instructions that, when executed by a processor, cause the processor to generate designs by performing the steps of generating a first plurality of designs based on a problem definition associated with a design problem and a first set of design variables associated with the design problem, analyzing the first plurality of designs statistically to determine a first statistical attribute associated with a first design variable included in the first set of design variables, and generating a graphical user interface (GUI) based on the first statistical attribute and the first plurality of designs to graphically depict the first statistical attribute.

12. The non-transitory computer-readable medium of clause 11, wherein the first statistical attribute comprises a first statistical dependency between the first design variable and a second design variable that is included in the first set of design variables.

13. The non-transitory computer-readable medium of any of clauses 11-12, further comprising the step of generating a first GUI element within the GUI that couples a first portion of the GUI associated with the first design variable to a second portion of the GUI associated with the second design variable, wherein the GUI graphically depicts the first statistical attribute via the first GUI element.

14. The non-transitory computer-readable medium of any of clauses 11-13, further comprising the step of generating a first GUI element within the GUI that includes one or more visual attributes that correspond to a magnitude of the first statistical dependency.

15. The non-transitory computer-readable medium of any of clauses 11-14, wherein the GUI comprises a first arc associated with the first design variable and a second arc associated with a second design variable included in the first set of design variables, and further comprising the step of generating a first GUI element within the GUI that couples the first arc to the second arc based on the first statistical dependency.

16. The non-transitory computer-readable medium of any of clauses 11-15, wherein the GUI includes a first GUI element that is coupled to a first portion of the problem definition that is associated with the first design variable and includes a second GUI element that is coupled to a second portion of the problem definition that is associated with the second design variable, wherein the GUI graphically depicts the first statistical attribute via the first GUI element.

17. The non-transitory computer-readable medium of any of clauses 11-16, wherein the first statistical attribute comprises a first probability of the first design variable being assigned a first design value in the first plurality of designs, and further comprising the step of generating a first GUI element within the GUI with at least one visual attribute that is derived from the first probability, wherein the GUI graphically depicts the first statistical attribute via the first GUI element.

18. The non-transitory computer-readable medium of any of clauses 11-17, further comprising the steps of generating a second plurality of designs based on the first probability and the first set of design variables, analyzing the second plurality of designs statistically to determine a second statistical attribute associated with the first design variable, and modify the GUI based on the second statistical attribute and the second plurality of designs to graphically depict the second statistical attribute.

19. The non-transitory computer-readable medium of any of clauses 11-18, further comprising the steps of generating a first probability distribution associated with a first set of design values assigned to the first set of design variables, extracting one or more samples from the first probability distribution, generating a second plurality of designs based on the one or more samples, wherein the second plurality of designs includes a second set of design values assigned to the first set of design variables, and modifying the GUI based on the second set of design values to graphically depict at least one statistical attribute of the second set of design values.

20. Some embodiments include a system, comprising a memory storing a software application, and a processor that, when executing the software application, is configured to perform the steps of generating a first plurality of designs based on a problem definition associated with a design problem and a first set of design variables associated with the design problem, analyzing the first plurality of designs statistically to determine a first statistical attribute associated with a first design variable included in the first set of design variables, and generating a graphical user interface (GUI) based on the first statistical attribute and the first plurality of designs to graphically depict the first statistical attribute.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating computer-aided designs of mechanical assemblies, the method comprising:
   generating a first plurality of designs of mechanical assemblies based on a problem definition associated with a design problem and a first set of design variables associated with the design problem, wherein each design included in the first plurality of designs represents different types of mechanical components by assigning values to the first set of design variables;
   analyzing the first plurality of designs to determine a first statistical attribute associated with a first design variable included in the first set of design variables; and
   generating a graphical user interface (GUI) based on the first statistical attribute and the first plurality of designs to graphically depict the first statistical attribute.

2. The computer-implemented method of claim 1, wherein the first statistical attribute comprises a first statistical dependency between the first design variable and a second design variable that is included in the first set of design variables.

3. The computer-implemented method of claim 2, further comprising generating a first GUI element within the GUI that couples a first portion of the GUI associated with the first design variable to a second portion of the GUI associated with the second design variable, wherein the GUI graphically depicts the first statistical dependency via the first GUI element.

4. The computer-implemented method of claim 2, further comprising generating a first GUI element within the GUI that includes one or more visual attributes that correspond to a magnitude of the first statistical dependency.

5. The computer-implemented method of claim 2, wherein the GUI comprises a first arc associated with the first design variable and a second arc associated with the second design variable, and further comprising generating a first GUI element within the GUI that couples the first arc to the second arc based on the first statistical dependency.

6. The computer-implemented method of claim 1, wherein the GUI includes a first GUI element that is coupled to a first portion of the problem definition that is associated with the first design variable and includes a second GUI element that is coupled to a second portion of the problem definition that is associated with the second design variable, wherein the GUI graphically depicts the first statistical dependency via the first GUI element.

7. The computer-implemented method of claim 1, wherein the first statistical attribute comprises a first probability of the first design variable being assigned a first design value in the first plurality of designs.

8. The computer-implemented method of claim 7, further comprising generating a first GUI element within the GUI with at least one visual attribute that is derived from the first probability, wherein the GUI graphically depicts the first statistical attribute via the first GUI element.

9. The computer-implemented method of claim 7, further comprising:
generating a second plurality of designs of mechanical assemblies based on the first probability and the first set of design variables;
analyzing the second plurality of designs to determine a second statistical attribute associated with the first design variable; and
modifying the GUI based on the second statistical attribute and the second plurality of designs to graphically depict the second statistical attribute.

10. The computer-implemented method of claim 1, further comprising:
generating a first probability distribution associated with a first set of design values assigned to the first set of design variables;
extracting one or more samples from the first probability distribution;
generating a second plurality of designs of mechanical assemblies based on the one or more samples, wherein the second plurality of designs includes a second set of design values assigned to the first set of design variables; and
modifying the GUI based on the second set of design values to graphically depict at least one statistical dependency associated with the second set of design values.

11. One or more non-transitory computer-readable media storing instructions that, when executed by one or more processors, cause the one or more processors to perform the steps of:
generating a first plurality of designs of mechanical assemblies based on a problem definition associated with a design problem and a first set of design variables associated with the design problem, wherein each design included in the first plurality of designs represents different types of mechanical components by assigning values to the first set of design variables;
analyzing the first plurality of designs to determine a first statistical attribute associated with a first design variable included in the first set of design variables; and
generating a graphical user interface (GUI) based on the first statistical attribute and the first plurality of designs to graphically depict the first statistical attribute.

12. The one or more non-transitory computer-readable media of claim 11, wherein the first statistical attribute comprises a first statistical dependency between the first design variable and a second design variable that is included in the first set of design variables.

13. The one or more non-transitory computer-readable media of claim 12, further comprising generating a first GUI element within the GUI that couples a first portion of the GUI associated with the first design variable to a second portion of the GUI associated with the second design variable, wherein the GUI graphically depicts the first statistical dependency via the first GUI element.

14. The one or more non-transitory computer-readable media of claim 12, further comprising generating a first GUI element within the GUI that includes one or more visual attributes that correspond to a magnitude of the first statistical dependency.

15. The one or more non-transitory computer-readable media of claim 12, wherein the GUI comprises a first arc associated with the first design variable and a second arc associated with the second design variable, and further comprising generating a first GUI element within the GUI that couples the first arc to the second arc based on the first statistical dependency.

16. The one or more non-transitory computer-readable media of claim 11, wherein the GUI includes a first GUI element that is coupled to a first portion of the problem definition that is associated with the first design variable and includes a second GUI element that is coupled to a second portion of the problem definition that is associated with the second design variable, wherein the GUI graphically depicts the first statistical dependency via the first GUI element.

17. The one or more non-transitory computer-readable media of claim 11, wherein the first statistical attribute comprises a first probability of the first design variable being assigned a first design value in the first plurality of designs.

18. The one or more non-transitory computer-readable media of claim 17, further comprising generating a first GUI element within the GUI with at least one visual attribute that is derived from the first probability, wherein the GUI graphically depicts the first statistical attribute via the first GUI element.

19. The one or more non-transitory computer-readable media of claim 17, further comprising:
generating a second plurality of designs of mechanical assemblies based on the first probability and the first set of design variables;
analyzing the second plurality of designs to determine a second statistical attribute associated with the first design variable; and modifying the GUI based on the second statistical attribute and the second plurality of designs to graphically depict the second statistical attribute.

20. The one or more non-transitory computer-readable media of claim 11, further comprising:

generating a first probability distribution associated with a first set of design values assigned to the first set of design variables;

extracting one or more samples from the first probability distribution;

generating a second plurality of designs of mechanical assemblies based on the one or more samples, wherein the second plurality of designs includes a second set of design values assigned to the first set of design variables; and modifying the GUI based on the second set of design values to graphically depict at least one statistical dependency associated with the second set of design values.

21. A system, comprising:

one or more memories storing instructions; and one or more processors that are coupled to the one or more memories and, when executing the instructions, are configured to perform the steps of:

generating a first plurality of designs of mechanical assemblies based on a problem definition associated with a design problem and a first set of design variables associated with the design problem, wherein each design included in the first plurality of designs represents different types of mechanical components by assigning values to the first set of design variables;

analyzing the first plurality of designs to determine a first statistical attribute associated with a first design variable included in the first set of design variables; and generating a graphical user interface (GUI) based on the first statistical attribute and the first plurality of designs to graphically depict the first statistical attribute.

* * * * *